United States Patent [19]

Kemp

[11] 4,249,889
[45] Feb. 10, 1981

[54] METHOD AND APPARATUS FOR PREHEATING, POSITIONING AND HOLDING OBJECTS

[76] Inventor: Willard E. Kemp, 14702 Broadgreen, Houston, Tex. 77079

[21] Appl. No.: 45,840

[22] Filed: Jun. 5, 1979

[51] Int. Cl.³ .......................... F27D 3/00; F27B 15/00
[52] U.S. Cl. ......................................... 432/11; 13/23; 266/251; 414/754; 414/755; 432/15; 432/58; 432/197
[58] Field of Search ................. 432/11, 197, 15, 58; 414/754, 755; 266/249, 250, 251; 13/23

[56] References Cited

U.S. PATENT DOCUMENTS

| | | |
|---|---|---|
| 2,830,343 | 4/1958 | Schroyer . |
| 3,157,924 | 11/1964 | Smith . |
| 3,196,251 | 7/1965 | DeBruyne . |
| 3,197,328 | 7/1965 | Jung et al. .......................... 432/197 |
| 3,250,521 | 5/1966 | Sergent ................................. 432/197 |
| 3,295,175 | 1/1967 | Krzyzanowski . |
| 3,302,256 | 2/1967 | Wittmoser . |
| 3,314,116 | 4/1967 | Wittmoser et al. . |
| 3,339,620 | 9/1967 | Krzyzanowski . |
| 3,350,915 | 11/1967 | Staffin . |
| 3,410,942 | 11/1968 | Bayer . |
| 3,452,806 | 7/1969 | Wittmoser . |
| 3,496,989 | 2/1970 | Paoli . |
| 3,498,360 | 3/1970 | Wittmoser et al. . |
| 3,498,365 | 3/1970 | Wittmoser et al. . |
| 3,524,633 | 8/1970 | Shiller ................................. 432/197 |
| 3,557,867 | 1/1971 | Krzyzanowski . |
| 3,572,421 | 3/1971 | Mezey et al. . |
| 3,581,802 | 1/1971 | Krzyzanowski . |
| 3,619,866 | 11/1971 | Hofmann et al. . |
| 3,620,286 | 11/1971 | Hofmann . |
| 3,654,987 | 4/1972 | Wittmoser et al. . |
| 3,678,982 | 7/1972 | Krzyzanowski . |
| 3,694,924 | 10/1972 | Staffin . |
| 3,741,281 | 6/1973 | Hauser-Lienhard . |
| 3,766,969 | 10/1973 | Mezby et al. . |
| 3,842,899 | 10/1974 | Hauser-Lienhard . |
| 3,861,454 | 1/1975 | Mezey . |
| 3,998,441 | 12/1976 | Schuster et al. ...................... 266/250 |
| 4,013,279 | 3/1977 | Virr ....................................... 266/249 |
| 4,050,289 | 9/1977 | Fairbairn et al. . |
| 4,054,376 | 10/1977 | Wareham ............................ 432/15 X |
| 4,068,389 | 1/1978 | Staffin et al. . |
| 4,121,091 | 10/1978 | Wareham ............................ 165/104 F |

FOREIGN PATENT DOCUMENTS 1045626 10/1966 United Kingdom .
1537486 12/1978 United Kingdom .

OTHER PUBLICATIONS

Industrial Heating The Journal of Thermal Technology, Sep. 1978, pp. 32-35.
Steel Casting Research and Trade Association, No. 41, Jun. 1978, "Potential Improvements in Shell Mould Casting Practice" by D. Bish and Dr. M. C. Ashton.

Primary Examiner—John J. Camby
Attorney, Agent, or Firm—Vaden & Bednar

[57] ABSTRACT

Method and apparatus comprising a fine particle bed for encompassing an object, means for fluidizing the bed, while heat treating the bed if desired, and defluidizing of the bed so as to hold the object at a desirably aligned position with an exposed portion above the bed surface for a subsequent operation. Magnetic means may be used for manipulating the object to a desired orientation and vacuum means may be provided to draw unwanted products of the subsequent operation down into the bed.

32 Claims, 2 Drawing Figures

METHOD AND APPARATUS FOR PREHEATING, POSITIONING AND HOLDING OBJECTS

BACKGROUND OF THE INVENTION

1. Field of the Invention

This invention pertains to material handling methods and apparatus and more particularly to such methods and apparatus combined with heat treating and cooling of the objects handled.

2. Description of the Prior Art

Castings come in various complex shapes. It is not uncommon for castings to include portions which are somewhat delicate, such as projections or webbing portions and the like. Raw castings are not suitable when they come from the mold for final assembly or use without being treated in further operations. For examples, the flashings have to be knocked off, inadvertent voids have to be filled in by welding, the casting often has to be welded or otherwise joined to other parts, the surface has to be painted or otherwise coated or treated and the like.

Universal jigs and fixtures for every type of castings are not available in the prior art. Moreover, special jigs and fixtures suitable for holding complex and irregularly shaped castings while these subsequent type operations are performed without injury to the coatings are expensive and complex. In addition, it is not uncommon to have to manipulate a casting in more than one position for more than one subsequent operation where orientation of the object in more than one selected alignment position is required. For example, it may be required to perform a welding operation on first one side and then the other where in both welding operations it is desirable to weld directly down on the part.

Some operations to castings also require masking of the untreated part from the treated part, such as when painting is done to one part while the rest is to be left unpainted or painted a different color.

Finally, it is often desirable to heat treat the casting prior to performing the next step. For example, when filling an inadvertent casting void, it is desirable to preheat the overall casting to a higher temperature level than room temperature before treating the specific spot to be welded. This is particularly true for alloy castings. The method in common use today in fabrication shops is to preheat such castings to 200° F.–300° F. or more in an air furnace or by merely subjecting such castings to torching. Needless to say, such preheating is extremely inefficient. It has been estimated that less than 1% of the BTU energy expended actually goes into the castings in the typical situation where castings are laid out on the floor around an open gas-jet flame. In addition, the heating is terribly non-uniform. Finally, the heat retention is poor, even when a blanket is put over such heated castings.

Therefore, it is a feature of the present invention to provide an improved method using improved, but simple, apparatus for holding even the most delicate of castings in almost any given position without injury to the casting.

It is another feature of the present invention to provide an improved method using improved, but simple, apparatus for uniformly and efficiently heating castings, storing the heat in the castings, and subsequently manipulating and holding the casting in a number of different desired positions for subsequent operations.

It is still another feature of the present invention to provide an improved method using improved, but simple, apparatus for manipulating, holding and masking objects for subsequent operations on the unmasked portions.

SUMMARY OF THE INVENTION

The invention embodiments disclosed herein concern a process utilizing a box of fine granular particles, typically sand, and means for fluidizing the contents of the box, or "bed". In a preferred operation, a casting is easily embedded in the sand bed while it is fluidized. An electromagnet can be used to manipulate a magnetizable casting, if desired. While the bed is still fluidized, heat is imparted to the bed, typically via ignited gas jets located just above the surface of the bed. After the casting has been "pre-heated" to the desired temperature, it is lifted and positioned so that a portion thereof is exposed above the surface while the remaining portion is still embedded. The casting is also positioned to be aligned in the desired manner for the subsequent operation (e.g., for welding, the part to be welded is desirably positioned and turned for most efficient welding). Then the fluidized bed is shut off so that the casting is firmly held in position. In most situations, the bulk of the casting remains embedded in the sand. The sand not only holds the casting firmly in place, but also retains heat in the casting. When the subsequent operation is painting or other coating, then the sand provides a masking of the embedded portion from the exposed portion. The casting is easily re-positioned for further operations by re-fluidizing the bed and adjusting the part, as desired.

The heating may be done in other manners such as embedded electrical heat strips or by induction heating. A vacuum can be placed on the bed for the downward removal of welding fumes, paint fumes or other noxious odors and airborne particles attendant to the operation. Also, a compartmentalized box allows fluidizing and positioning of a casting in one compartment while the castings in other compartments remain embedded so as to more fully preserve the preheat that has been imparted to them. Finally, the box can be removed from the heated location to another location equipped with fluidizing means so as to facilitate the positioning and holding of the casting without the need for the more expensive heating means at this subsequent location.

BRIEF DESCRIPTION OF THE DRAWINGS

So that the manner in which the above-recited features, advantages and objects of the invention, as well as others which will become apparent, are attained and can be understood in detail, a more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings

DESCRIPTION OF THE PREFERRED EMBODIMENTS

Figure 1:
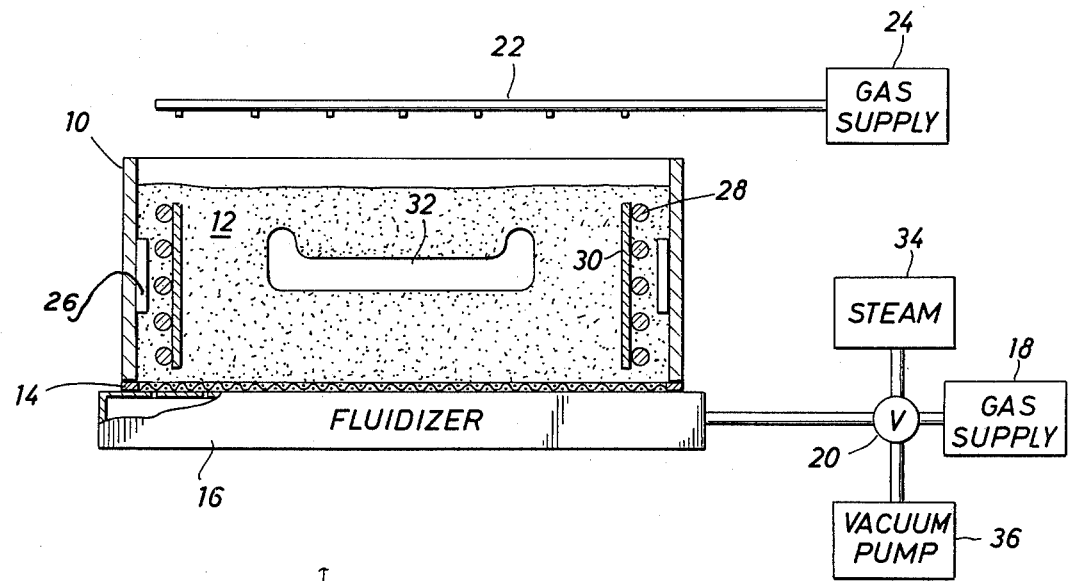
FIG. 1 is a composite cross-sectional view and block diagram of a preferred embodiment of the present invention.
Figure 1:
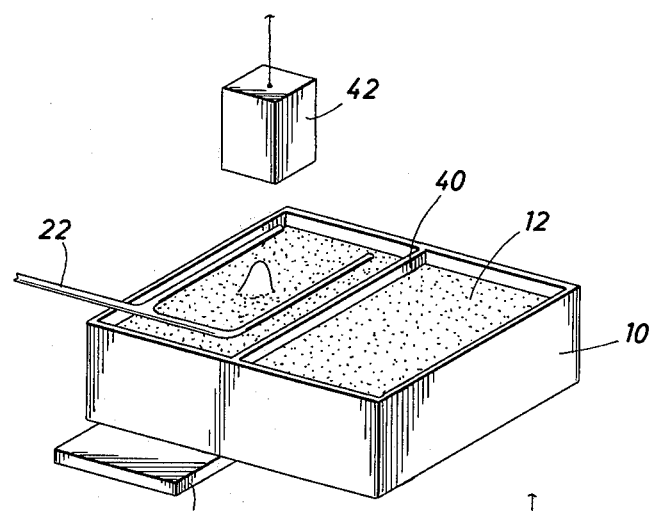
Figure 2:
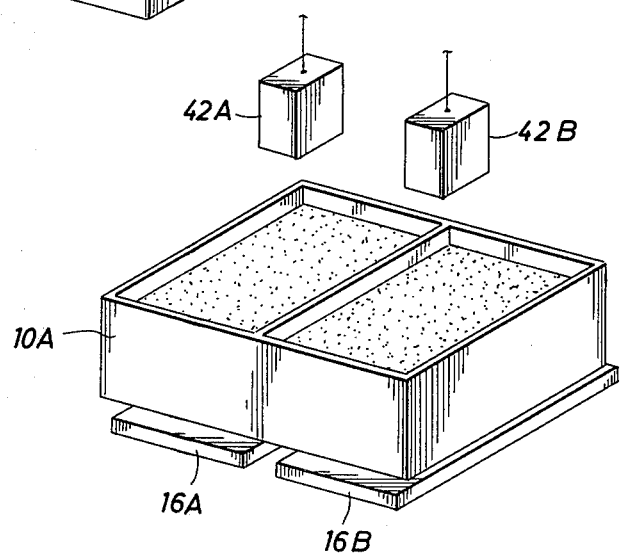
FIG. 2 is a pictorial view of another preferred embodiment of the present invention.

The apparatus employed for implementing the preferred embodiment of the present invention is illustrated in schematic form in FIGS. 1 and 2. A box 10 suitable for holding small granular particles, such as typically sand 12, is closed on the bottom with a very fine mesh screen 14 so that the compacted sand, which may include suitable binders, will not unduly sift out of the bottom when the box is lifted from a supporting surface. For the purpose of this invention, the box sits upon an air distribution plate of a fluidizer table 16.

Fluidizer support tables are occasionally available in the foundry and casting arts, although their use is rare. Such tables generally comprise a top plate having microscopically sized holes therein and a space beneath for providing means for building up a pressure. The surface tension of the fine holes causes the pressure forced from the fluidizer to establish uplifting air to spread uniformly over the surface, which, in turn, is imparted to the bed of sand through the screen in the bottom of the box. Fluidizing the sand causes slight particle separation throughout the bed of sand; however, the overall volume of sand does not appreciably increase, generally about 5 percent. This means that the level of the surface does not rise greatly from the at-rest or defluidized level of the sand bed. Air is supplied from a source 18 to the fluidizer through a valve or series of valving means 20.

Heat may be imparted to bed 12 via gas-fired heaters illustrated as a gas pipe 22 having a plurality of jets downwardly directed therefrom. Gas supply 24 furnishes the gas to the pipe. Alternatively, electric strips 26 positioned along the inside of the box walls and beneath the surface of the sand can be used for imparting heat to the sand bed. Finally an induction coil 28, which surrounds a heat dissipation cylinder 30, can be used for heating the bed. It is known that induction heating is useful for heating only uniform objects. Hence, the cylinder, such a uniform object, is first heated. Then, the heated cylinder transfers its heat to the bed. Although three different means are illustrated in FIG. 1, it should be understood that only one such heating means is necessary in a particular installation.

The casting or other object 32 to be operated on while being held in accordance with the present invention, is illustrated in FIG. 1 at a position embedded in the sand bed. Although illustrated as a regular form, it should be understood that the casting may be irregularly shaped having various projections, openings and the like as is common with castings.

Also shown in FIG. 1 is a steam source 34 connected to valving means 20 and a vacuum pump 36 connected to valving means 20. In operation, as will be explained more fully below, various steps of the procedure in accordance herewith, have (1) the air supply connected to the fluidizer, (2) the air supply and steam source connected to the fluidizer together, and (3) the vacuum pump connected to the fluidizer. Valves for permitting such connection possibilities are well known in the art and are not illustrated in detail in the drawing.

Now turning to the various possible operation modes for the apparatus, the first mode is for holding only. That is, there is no heat applied to the bed. For this mode, the bed is fluidized permitting the easy lowering of object 32 into the bed. The bed may have previously been preheated, if that were desired. In any event, the object can be turned and aligned at any desirable position so that the portion to be operated on is exposed from the bed while the remaining portion remains submerged in the sand. The fluidizing operation is then turned off to permit the sand to settle around the part and to hold it firmly in the predetermined position.

If a welding or painting or other fume and/or particle operation is the operating step for which the object is positioned, the vacuum pump is turned on to cause a down draft to occur through the bed. It has been discovered that the sand acts as a filter for removing unwanted products from the environment and, not only increases the comfort of the operator by removing unwanted airborne odors and particles, but also may make the operation safer and cooler.

Further, if desirable, a return path for the air flow used is creating the vacuum can be returned to the surface by appropriate duct-work. This accomplishes a recirculation of the air, having an especially beneficial effect on the efficiency of the operation as well as not spoiling the air pressure in the room. Of course, the same or similar duct-work could be used for recirculating air during the fluidizing operation effecting useful reuse of heated air (when this is desired, as more fully explained below) and drawing heat away from the operator so as to increase his comfort while manipulating objects in the bed.

The apparatus described above importantly can also be used for preheating an object as well as for holding it. For example, if it is desirable to bring the object up to a temperature substantially above room temperature, e.g., 300° F., the heat imparting means is turned on while the bed is being fluidized. For example, the gas pipe jets located an inch or so above the level of the bed surface will cause the object located in the bed to heat very evenly and very efficiently when compared to the open torch preheat method previously discussed. It has been discovered that a fluidized bed is a good heat conductor and, therefore, the heat applied at the surface quickly dissipates throughout the whole bed. Further, the bed heats relatively uniformly so that the object within is heated uniformly and spot heating is avoided. Once the object has been heated to the desired temperature level, the bed is defluidized. A defluidized sand bed has been discovered to be a good heat insulator. Hence, the object will retain heat for a relatively long period of time.

It is acceptable to put a gas flame within the bed under some conditions, although the above-the-bed location is acceptable. For example, gas flames have proven efficient when inserted into the top one or two inches of the bed. Electrical heating coils 26 within the bed may be used satisfactorily and induction coil 28 around the inside periphery of the bed may be used as yet another means for heating the bed. It is also possible under controlled conditions even to mix gas into the fluidized air and burn such combination entirely within the bed.

The source of gas for fluidizing the bed can be air. However, nitrogen, argon or other inert gas can also be used to minimize oxidation at high temperatures.

It is possible to utilize the fluidized bed as a means for adding carbon to the surface of the casting either to increase the carbonacious content or to replace that which may be given off by heating. This may be done by utilizing methane gas or other carbon-bearing gas as a source of fluidizing gas.

Now referring to FIG. 2, a conveyor or other two-work station arrangement is illustrated. At the first station, box 10 is positioned with respect to a gas-fired heater 22 and a fluidizer 16, as previously explained, although in this embodiment, box 10 is illustrated as being divided into two compartments by partition wall 40 and fluidizer 16 is located only under one of the two compartments and the heater only operates in conjunction with one compartment. Hence, it is possible to preheat one compartment at a time and to move the box along to another station for one or more subsequent operations. Please also note that an electromagnet 42 may be used for manipulating the casting. The sand particles, being nonmagnetic, do not attach to the magnet, but the casting does. Of course, the object may also be manipulated by a gloved hand.

Although a partition wall is shown, it is possible to compartmentalize the box merely by fluidizing one area while leaving the remaining area not fluidized, there being no physical wall partitioning the two differently treated areas.

At the second station, a fluidizer 16A permits refluidizing one compartment of box 10A and a separately controlled fluidizer 16B permits independent refluidizing of the other compartment of box 10A. Magnets 42A and 42B are separately operable for positioning objects in the separate compartments. The primary savings of such a physical arrangement is that only one heating means is required, that located at the first station. The heat retention of the sand bed, defluidized and acting as an insulator, is sufficient that the castings do not lose their preheated temperature before the subsequent station operation.

A typical single compartment box may measure 20"×20" with the dimension of a two-compartment box measuring about 20"×40". Of course, boxes of even more compartments and of substantially different dimension can be used.

Also, covers of various types for retaining the materials can be used while transporting the boxes, if desired, and over the compartments not undergoing a present operation, if desired, for further heat retention. Various non-reactive methods have been discussed above for adding heat to the bed.

In addition, or alternatively, a bed of sand can be mixed with a combustible powdered material which causes a thermal reaction to occur within the bed and to thereby change the bed temperature, if desired. For example, powdered coal mixed with the sand will burn in conjunction with the fluidized and heated bed to add heat to the bed.

Finally, referring to FIG. 1, it is possible to quench or lower the temperature of the bed without ruining the fluidizing influence by injecting steam through valving means 20 from source 34. The steam vaporizes or sublimates, thereby cooling the bed.

The vacuum operation has been discussed above with regard collecting fumes and particles. It is also possible to include particles of certain reactants in the bed to enhance filtering and collection of objectionable products. For example, if the subsequent operation for the object for which it is being held liberates sulphurous vapors, the addition of limestone particles to the bed would result in a collection reaction.

While particular embodiments of the invention have been shown and described, it will be understood that the invention is not limited thereto, since many modifications may be made and will become apparent to those skilled in the art. For example, the discussion has pertained to castings primarily, although other objects could be similarly handled. Also with regard castings, the same box and bed employed in making the casting could be used for heat retention and holding in accordance with the description set forth above.

What is claimed is:

1. Method for positioning an irregular object over a wide range of object alignment positions and securely holding the object in a selected alignment position, comprising
   embedding the object in a bed comprised of small granular particles,
   fluidizing the bed,
   turning the object so that a portion thereof is exposed from the bed in the selected alignment position and a portion thereof remains embedded, and
   discontinuing the fluidizing so that the object is held in place by the defluidized particles.

2. The method in accordance with claim 1, wherein the granular particles are sand particles.

3. The method in accordance with claim 1, wherein the object is magnetizable, the granular particles are nonmagnetic and the turning of the object is accomplished using magnetic means.

4. Method for preheating, positioning and holding a metallic casting for a subsequent operation enhanced by having the object at an elevated temperature condition, comprising
   embedding the casting in a bed comprised of small granular particles,
   fluidizing the bed,
   heating the fluidized bed to the elevated temperature condition,
   turning the casting so that a portion thereof is exposed from the bed in a selected alignment position and a portion thereof remains embedded, and
   discontinuing the heating and fluidizing so that the casting is held in place by the defluidized particles.

5. The method in accordance with claim 4, wherein the granular particles are sand particles.

6. The method in accordance with claim 4, wherein the object is magnetizable, the granular particles are nonmagnetic and the turning of the object is accomplished using magnetic means.

7. The method in accordance with claim 4, wherein the heating of the fluidized bed is by heaters placed near the surface of the bed.

8. The method in accordance with claim 4, wherein the heating of the fluidized bed is by heaters placed within the bed.

9. The method in accordance with claim 4, wherein the heating of the fluidized bed is by an ignited fluidizing combustible gas mixture within the bed.

10. The method in accordance with claim 4, wherein at least some of the heated gas from the fluidizing step is returned from the surface of the bed to the underside of the bed.

11. The method in accordance with claim 4, and including vacuum means for placing a down-draft on the bed when the bed is defluidized.

12. The method in accordance with claim 11, wherein at least some of the down-draft on the bed is returned to the top surface of the bed.

13. The method in accordance with claim 4, and including the steps of fluidizing the bed, adjusting the casting within the bed so as to expose a predetermined position thereof and masking the embedded portion within the bed, and defluidizing the bed to hold the casting in place so that a coating operation can be performed on the predetermined portion without coating the embedded portion.

14. The method in accordance with claim 4, and including the steps of fluidizing the bed and applying a temperature to the bed different from the temperature present in the casting.

15. The method in accordance with claim 14, wherein the temperature applied to the bed is a cooling temperature.

16. The method in accordance with claim 4, wherein said fluidizing is by an inert gas to prevent excessive oxidizing of the casting.

17. The method in accordance with claim 4, wherein said fluidizing is by methane gas to impart carbon to the surface of the casting.

18. Method for preheating, positioning and holding a metallic casting for a subsequent operation, comprising at a first location,
   embedding the casting in a bed comprised of small granular particles,
   fluidizing the bed,
   heating the fluidized bed, and
   moving the bed from the first location to a second location, and
at the second location, fluidizing the bed,
   turning the casting so that a desired portion thereof is exposed from the bed in a selected alignment position and a portion thereof remains embedded, and
   discontinuing the fluidizing so that the casting is held in place by the defluidized particles.

19. Apparatus for positioning an irregular object over a wide range of object positions and securely holding the object in a selected alignment position, comprising a bed comprised of small granular particles, and fluidizing means associated with said bed for fluidizing initially said bed while an object embedded therein is handled and positioned into a selected position so that a portion of the object is exposed from the bed and a portion thereof remains embedded and subsequently terminating fluidizing said bed so that the object is held in place at the selected position by the defluidized particles.

20. Apparatus in accordance with claims 19, wherein said bed is comprised of sand particles.

21. Apparatus in accordance with claim 19, wherein the object is magnetizable, the granular particles of the bed are non-magnetic and wherein said apparatus includes magnetic means for handling and positioning the object while the bed is fluidized.

22. Apparatus in accordance with claim 19, and including heating means for imparting heat to the bed while it is fluidized.

23. Apparatus in accordance with claim 22, wherein said granular particles include powdered coal which is ignited by said heating means while said bed is fluidized to add additional heat to said bed.

24. Apparatus in accordance with claim 22, wherein said bed is enclosed in a portable box and including a second fluidizing means for accepting said portable box at a different location from said heating means for refluidizing said bed at said second location to permit handling and positioning of the object thereat.

25. Apparatus in accordance with claim 19, wherein said heating means includes at least one gas pipe heater placed in close proximity above the surface of the bed.

26. Apparatus in accordance with claim 19, wherein said heating means includes at least one gas pipe heater placed in close proximity beneath the surface of the bed.

27. Apparatus in accordance with claim 19, wherein said heating means includes means for mixing combustible gas with said fluidizing means for igniting and imparting heat to the bed.

28. Apparatus in accordance with claim 19, wherein said heating means includes at least one electrical heating strip placed beneath the surface of the bed.

29. Apparatus in accordance with claim 19, wherein said heating means includes induction heating means.

30. Apparatus in accordance with claim 19, wherein said bed is divided into compartments, only one of which is located above said fluidizing means.

31. Apparatus in accordance with claim 19, and including vacuum means for drawing a down draft on said bed.

32. Apparatus in accordance with claim 19, and including steam generation means connected to said fluidizing means for imparting steam to the bed, which vaporizes and imparts cooling to the bed.

* * * * *